United States Patent
Ramirez

(10) Patent No.: US 10,982,487 B2
(45) Date of Patent: Apr. 20, 2021

(54) SYSTEMS AND METHODS FOR TINTABLE CAR WINDOWS HAVING DISPLAY CAPABILITIES

(71) Applicant: Victor Ramirez, Oxnard, CA (US)

(72) Inventor: Victor Ramirez, Oxnard, CA (US)

( * ) Notice: Subject to any disclaimer, the term of this patent is extended or adjusted under 35 U.S.C. 154(b) by 0 days.

(21) Appl. No.: 17/000,294

(22) Filed: Aug. 22, 2020

(65) Prior Publication Data

US 2021/0054691 A1  Feb. 25, 2021

Related U.S. Application Data

(63) Continuation of application No. 17/000,253, filed on Aug. 21, 2020.

(60) Provisional application No. 62/922,697, filed on Aug. 23, 2019.

(51) Int. Cl.
| | | |
|---|---|---|
| G06F 17/00 | (2019.01) | |
| E06B 9/24 | (2006.01) | |
| B60K 37/02 | (2006.01) | |
| B60R 1/00 | (2006.01) | |
| B60K 35/00 | (2006.01) | |
| B60L 53/51 | (2019.01) | |
| B60L 1/00 | (2006.01) | |

(52) U.S. Cl.
CPC ............ *E06B 9/24* (2013.01); *B60K 35/00* (2013.01); *B60K 37/02* (2013.01); *B60L 1/00* (2013.01); *B60L 53/51* (2019.02); *B60R 1/001* (2013.01); *B60K 2370/1438* (2019.05); *B60K 2370/1523* (2019.05); *B60K 2370/27* (2019.05); *B60K 2370/349* (2019.05); *B60K 2370/785* (2019.05); *E06B 2009/2464* (2013.01)

(58) Field of Classification Search
CPC ... E06B 9/24; E06B 2009/2464; B60R 1/001; B60K 37/02; B60K 35/00; B60K 2370/27; B60K 2370/349; B60K 2370/1438; B60K 2370/785; B60L 53/51; B60L 1/00
USPC .......................................................... 701/36
See application file for complete search history.

(56) References Cited

U.S. PATENT DOCUMENTS

| | | | | |
|---|---|---|---|---|
| 9,467,515 | B1 * | 10/2016 | Penilla ............... | G06F 3/04845 |
| 2002/0063809 | A1 * | 5/2002 | Fletcher .............. | G02F 1/1313 |
| | | | | 349/16 |
| 2003/0035917 | A1 * | 2/2003 | Hyman ................. | B41M 5/36 |
| | | | | 428/67 |
| 2012/0290950 | A1 * | 11/2012 | Rapaport ........... | H04N 21/8358 |
| | | | | 715/753 |
| 2015/0220299 | A1 * | 8/2015 | Kim ..................... | G06F 3/013 |
| | | | | 345/1.3 |
| 2016/0001781 | A1 * | 1/2016 | Fung ..................... | B60K 28/02 |
| | | | | 701/36 |
| 2017/0075183 | A1 * | 3/2017 | Brown ................. | G05B 19/048 |
| 2017/0300736 | A1 * | 10/2017 | Song .................... | G06K 9/0004 |
| 2017/0336970 | A1 * | 11/2017 | Kim ..................... | G06F 3/0416 |
| 2018/0074676 | A1 * | 3/2018 | Lee ...................... | G06F 3/04842 |

(Continued)

*Primary Examiner* — Ronnie M Mancho

(74) *Attorney, Agent, or Firm* — Zhen Law Firm; Chris J Zhen

(57) ABSTRACT

A window system for use in a vehicle is disclosed. The window system may include a first layer electrically controlled to fade between states including an opaque state and a transparent state. The window system may include a second layer electrically controlled to display visual imagery on the window, where the first layer and second layer are configured to derive at least a portion of energy for their operation from a solar light source.

24 Claims, 8 Drawing Sheets

(56) References Cited

U.S. PATENT DOCUMENTS

| | | | |
|---|---|---|---|
| 2018/0322673 A1* | 11/2018 | Choi | G06T 5/002 |
| 2018/0364869 A1* | 12/2018 | Lee | G06F 3/0421 |
| 2019/0033504 A1* | 1/2019 | Miyata | B32B 25/02 |
| 2019/0079717 A1* | 3/2019 | Lee | G06F 3/013 |
| 2019/0292095 A1* | 9/2019 | Fukushi | C03B 29/025 |
| 2019/0303640 A1* | 10/2019 | Song | G06K 9/00033 |
| 2019/0317458 A1* | 10/2019 | Shrivastava | G02F 1/163 |
| 2020/0005735 A1* | 1/2020 | Kim | G06F 3/0481 |
| 2020/0057421 A1* | 2/2020 | Trikha | G02F 1/163 |
| 2020/0057517 A1* | 2/2020 | Ogumi | G06F 3/044 |
| 2020/0150508 A1* | 5/2020 | Patterson | E06B 9/24 |

\* cited by examiner

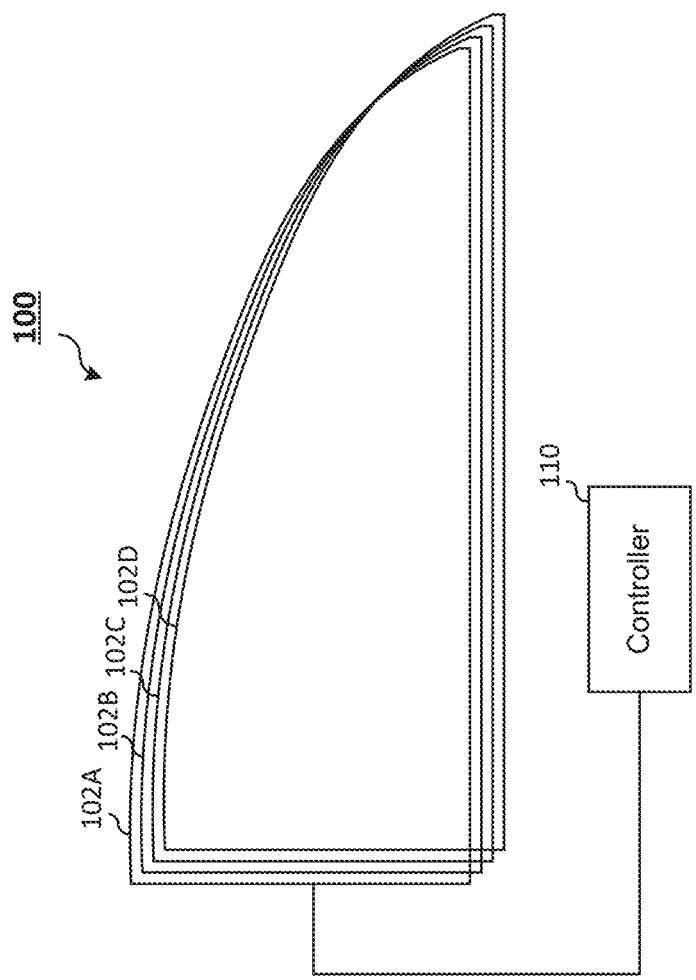

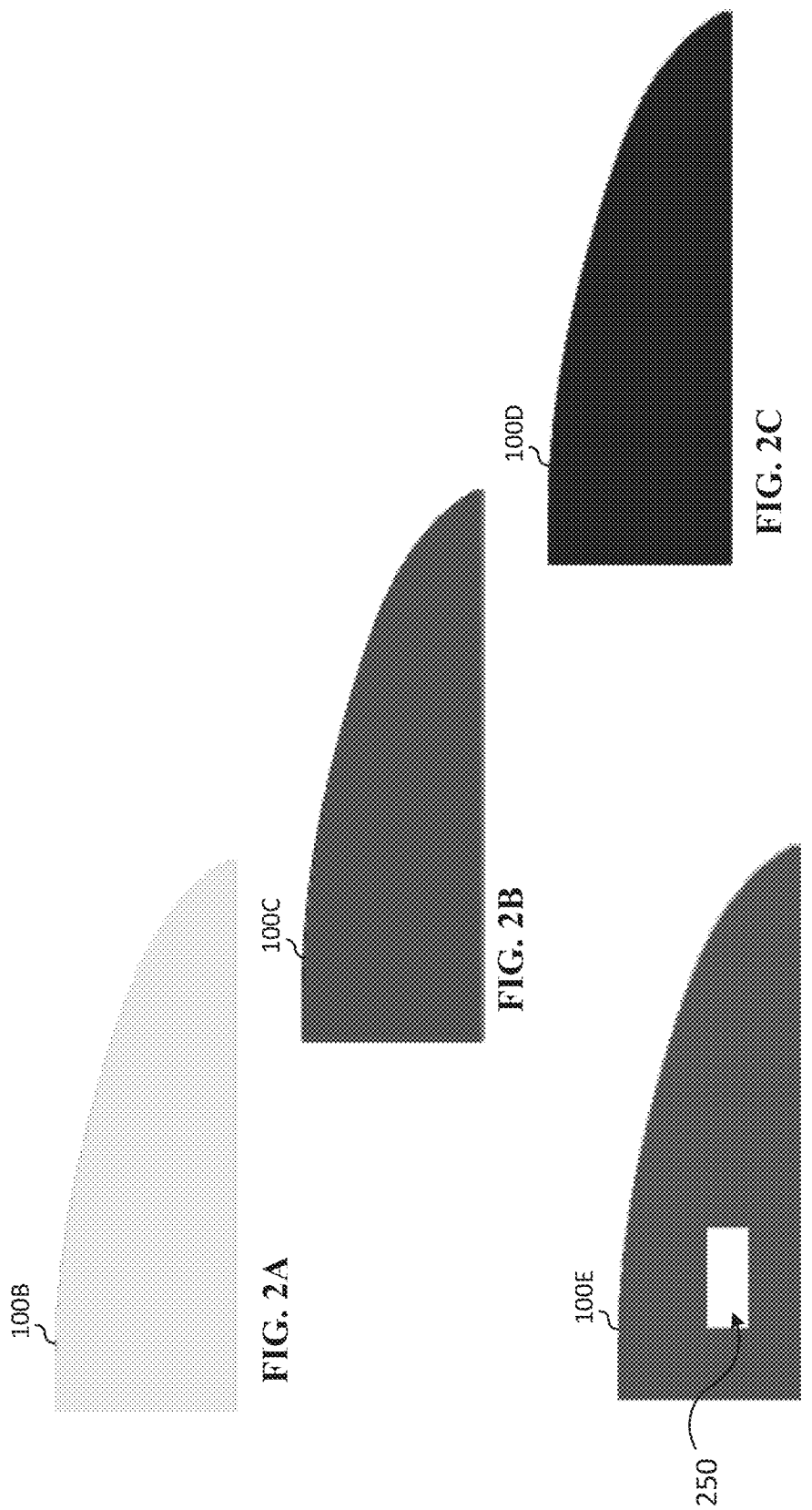

SYSTEMS AND METHODS FOR TINTABLE CAR WINDOWS HAVING DISPLAY CAPABILITIES

CROSS-REFERENCE TO RELATED APPLICATION

This application claims the benefit of U.S. patent application Ser. No. 17/000,253, filed Aug. 21, 2020, which claims benefit to U.S. Provisional Patent Application No. 62/922,697, filed Aug. 23, 2019, all of which are incorporated by reference herein in their entirety.

BACKGROUND

Field

The present disclosure relates to the field of vehicle window systems, and more particularly to electrically controlled tint-able window systems.

Background

Passenger vehicles typically include an interior cabin that has windows including front and rear windshields and side windows providing views of the exterior of the vehicle. Passengers are able to enjoy expansive views of the environment around the vehicles through the windows throughout the cabin. In some instances, however, occupants (whether the driver or passengers) may wish to reduce light entering the vehicle cabin.

The amount of light entering the vehicle cabin is typically difficult to control. Vehicles may have mechanical sunshades that provide partial relief; some vehicles may have manual pull-up/pull-down shades covering some or all portions of a window; passengers may drape cloth over the window area. Yet vehicle owners tint vehicle windows with films to permanently alter the light transmitted through the windows. These methods, however, fail to provide convenient means to dynamically control the actual surfaces of the vehicle windows for the convenience of the vehicle occupants.

Windows in vehicles also represent a significant portion of surface area that may be better utilized for passenger entertainment. Car entertainment systems typically include small displays residing on the center dashboard area. In some cases, small displays may be incorporated into headrests for passenger viewing. More recently, passengers have brought portable tablets and other devices in lieu of built-in entertainment systems.

In recent years, technology has enabled driverless and semi-autonomous modes for vehicles freeing the human driver from manually driving the vehicles. In such modes, drivers and their passengers may enjoy in-car entertainment. When the driver is freed from manually piloting the vehicles, the windows may also be used for entertainment rather than merely as a transparent view of the exterior environment.

Accordingly, there exists an opportunity to provide greater capabilities and entertainment through the windows of vehicle systems.

SUMMARY

In an aspect of the disclosure, a window system for use in a vehicle is provided. The window system may include a first layer electrically controlled to fade between states comprising an opaque state and a transparent state. The window system may include a second layer electrically controlled to display visual imagery on the window, where the first layer and second layer are configured to derive at least a portion of energy for their operation from a solar light source.

In another aspect of the disclosure, a method for controlling a tint-able window system of a vehicle is provided. The method may include controlling a light transmission state of a first layer of the window system. The method may include controlling visual imagery output of a second layer of the window system. The method may include receiving at least a portion of power from a solar energy source for controlling the first layer and the second layer.

In another aspect of the disclosure, a vehicle system having an electrically controlled tint-able window is provided. The vehicle system may include the electrically controlled fade-able window, the window comprising a first layer electrically controlled to fade between opaque states and a second layer electrically controlled to display visual imagery. The vehicle system may include a solar energy collector coupled to the window for providing at least a portion of energy for operation of the window.

BRIEF DESCRIPTION OF THE DRAWINGS

The present disclosure is illustrated by way of example, and not by way of limitation, and may be more fully understood with reference to the following detailed description when considered in connection with the figures below.

FIG. 1 is an exemplary block diagram of a tint-able car window system including exemplary layers providing for the functionality of tint-ability, display output, energy capture, and input in accordance with embodiments of the disclosure.

FIGS. 2A-D illustrate some example settings of the dimmable layer 102C of window system 100 of FIG. 1.

DETAILED DESCRIPTION

Figure 3A:
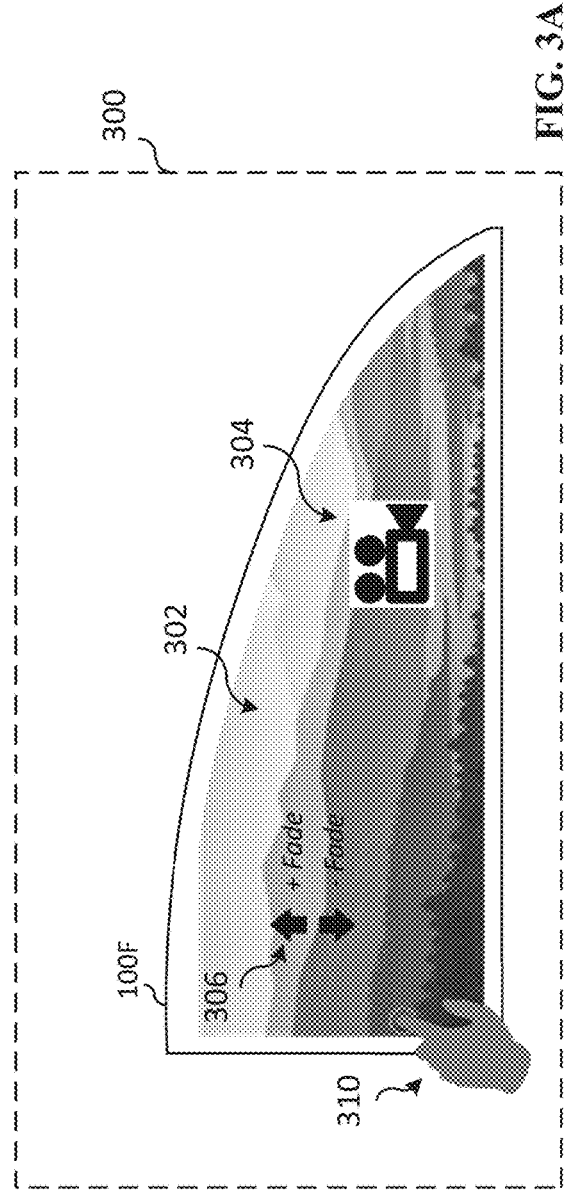
FIGS. 3A-B illustrate example user interfaces for managing the window system 100 of FIG. 1, including an integrated UI and a separate UI.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Methods and systems are provided for car window systems having tint-able features or ability to fade the outside environment. In this disclosure, tint-able, fade-able, dimmable may be used interchangeably. The window system may refer to each individual window panel including the electronic elements, or the window system may refer to some or all of the window panels of a vehicle including some or all the electronic elements.

The tint-able feature may enable changing the window visible state from transparent (complete transmission of light through window) to opaque (no transmission of light through window). In another embodiment, the window systems may include a feature for display capability such as an embedded organic light emitting diode (OLED) layer on the window system. In another embodiment, the window system may include a feature for power capture such as an embedded solar cell layer. The solar cell layer may produce a wattage from the ambient light. The power generated by the solar cell may be used to power the window systems, vehicle systems, or charge a battery. In some embodiments, the solar cell may enable partially or completely recharging the batteries of the vehicle (e.g., during operation when excess power is produced or when the vehicle is in an off state, etc.).

In another embodiment, the window system may include a feature for user input such as an embedded touch sensitive layer. Additional layers (e.g., a glass layer, a polycarbonate layer, etc.) may be included based on design parameters or user preference. In some embodiments, the layers may be oriented in any functional arrangement. In some embodiments, each function may be provided on its own physical layer; in other embodiments, any number of functions may be provided on a given physical layer. For example, the display layer (e.g., the OLED layer) may share the same physical substrate as the touch sensitive layer.

FIG. 1 illustrates an example window system 100 showing the exemplary functional layers 102A-D. The example of FIG. 1 shows four functional layers including a layer 102A for energy capture, a layer 102B for tinting the window using electronic control, a layer 102C for display output, and a layer 102D for user input (e.g., a touch sensitive layer). While the example includes four layers, it will be recognized that any number of layers are possible. The window system 100 may include at least two of the layers 102A-D. In some embodiments, as illustrated in FIG. 1, the embodiments may include four or more layers. One layer 102C may include a display layer such as an OLED layer for producing light output or a video surface. For example, such video surface may show news channels, sports, cartoons for kids, simulated or live scenery (e.g., favorite coastal sunset scenery, etc.), far away places or any other images or videos such as users' or passenger's timeline of favorite photo sides. In some embodiments, the window system 100 may be coupled to users' devices (e.g., mobile devices) and interactively present multimedia based on the user's device storage (e.g., personal videos from a cell phone). The interactions by the window system 100 may be performed wired or wirelessly (e.g., over Bluetooth, Wi-Fi, etc.). The window system 100 may include a controller 110. The controller 110 may include modules for enabling and interacting with the window system 100, such as processors, firmware, I/O modules, wireless interfaces, etc.

It will be appreciated that the OLED design may vary based on design parameters or user preferences. For example, the OLED structure may cover the entire surface area or only some areas of the window surface. OLED is an emissive technology and may be suitable for this application because it does not require a backlight that other technologies such as LCDs may require. While the disclosure may incorporate OLED technology, the other technologies such as transparent LCDs or holographic projections may be used as dictated by design or preference. In the embodiments where other technologies (such as transparent LCD or holographic projections) are used, it will be appreciated that modifications to the design of the layer or the window system 100 may be appropriate. For example, projection screens may require a projector mounted in the vehicle cabin and a reflective coating on the window surface, so that in embodiments including projection technology, the layer may include reflective coating.

Another layer 102D may include a surface for user input. For example, a touch-sensitive surface may be implemented as layer 102D. One skilled in the art will recognize that this layer is merely to read user input based on passenger fingers and gestures, and that the disclosure is not limited to touch-sensitive surfaces. In some examples, a physical layer may not be necessary when camera systems are used. For example, cameras (e.g., visible light or infrared range) may be used to read user input on any surface. In addition, or in the alternative, the users may make motions anywhere within the cabin area to provide input for the window system 100. The camera system, e.g., situated on the roof of the vehicle, may capture the user input made anywhere within line-of-sight of the camera system.

The dimmable layer 102B may be implemented using any suitable technology including electrochromic glass, photochromic glass, thermochromic glass, suspended-particle glass, micro-blind glass, polymer-dispersed glass, liquid-crystal glass, etc. The dimmable layer 102B may include continuous or discrete transitions from complete transparency to complete opacity. For example, when it is bright outside, the window system 100 may be controlled by the user or automatically (e.g., using light sensor) to dim the dimmable layer 102B to a high opacity or complete opacity. When there is little or no light outside such as during nighttime driving, the window system 100 may be controlled by the user or automatically (e.g., using light sensor) to switch the dimmable layer 102B to high transparency or complete transparency. The dimmable function may complement the brightness of the media output on the display layer 102C, in addition, or in the alternative, the dimmable function may be based on the ambient outside light so the media content on the display layer 102C may be enjoyed by vehicle occupants without annoying sudden changes in brightness.

In some embodiments, the dimmable layer 102B may provide protection to ultra-violet (UV) or other forms of radiation.

The display layer 102C may be controlled by a user or by computer control (e.g., via controller 110 or other modules not shown that may be coupled the controller 110 or directly to the window system 100) or some combination of the two. Computer control may include automatic control based on environmental parameters (e.g., ambient light) or other factors such as location of the vehicle, time of day, available energy from the vehicle system (e.g., display may be shown at low power settings during low power operation), etc.

The window system 100 may be used on one or more of the windows or windshields of a vehicle, including the front windshield, rear windshield, side windows, etc. The window system 100 may be a replacement or augmentation of the existing windows/surfaces on the vehicle. A roof window may also include the window system 100. With all windows using a window system 100, maximal surface area may be provided for capturing solar energy and providing maximal dimmable and entrainment surface areas. Each window system 100 may be independently controlled, e.g., by a passenger next to the window, or the window systems 100 may be controlled in aggregate or in sync. In embodiments with a roof window system 100, the window panel may include a solar cell layer. In other embodiments with no roof window, an independent solar cell array may be installed on top of the roof of the vehicle.

Certain embodiments of the disclosure may provide transparent interactive displays (e.g., through display layer 102C) that enhance the passenger experience. For example, embodiments may enable passengers to interact with the window system 100 to control an electronic window shade that is user definable using user input (e.g., through a vehicle dash-based system or through surface controls on the window system 100). The transparent display may be configured to provide information about the current commute (e.g., destination time, trip data, route, distance, weather, upcoming traffic, etc.), and may be super-imposed on, embedded within, or formed as part of the window panel of a vehicle. As described above, for example, the display may be a layer of the window system 100 or may be a physically separate component.

While FIG. 1 shows the layers in a particular arrangement, one skilled in the art will recognize that other arrangements or orders of the layers may be possible.

Photovoltaic cells (solar collectors) may be placed on an outer layer (outside surface) to capture solar energy. The photovoltaic cells may be configured to capture energy from the OLEDs that may otherwise be lost to the environment. For example, light scattered backwards (toward outside of windows) may be captured by the photovoltaic cells.

The window systems 100 may be installed in conventional internal combustion engine (ICE) vehicles. In other embodiments, the window systems may be installed in alternative fuel vehicles including battery or hydrogen electrical vehicles. An exemplary vehicle system may include an autonomous mode controller and an entertainment system controller.

The figures illustrate exemplary vehicle entertainment systems for a vehicle. The system may take many different forms and include multiple and/or alternate components and facilities. While an exemplary system may be shown, the exemplary components illustrated are not intended to be limiting. Additional or alternative components and/or implementations may be used.

FIG. 2 illustrates some example settings of the dimmable layer 102C of window system 100. The layer 102C may allow the continuous or discrete transitions from opaque to clear. In the examples of FIGS. 2A-C, the window system is shown with a lighter setting (less opaque, more transparent) in FIG. 2A, a medium setting in FIG. 2B, and a darker setting (more opaque, less transparent) in FIG. 2C.

In some embodiments such as shown in FIG. 2D, the interactive dimmable window systems 100 and methods may allow passengers to create electronic clear apertures 250 in shaded portions of the window system 100, enabling a localized viewable experience of the outside world without flooding the cabin with light. The aperture 250 may be time-controlled, and revert to a fully-shaded state after a set period of time. The aperture may be controlled based on distance to or from source and destination locations.

Another embodiment may provide systems and methods that reduce light flooding into the cabin when a passenger seated next to a window chooses to look out of the window. Such functionality may be enabled by camera modules (not shown) that monitor the passengers and/or passenger biometrics such as eye gaze, etc. In some embodiments, the camera modules may be enabled to use facial recognition for input. For example, facial recognition may be used to provide gestures for controlling the window systems. In other examples, face recognition may be used to control other vehicle systems and devices (e.g., controlling car entertainment modules, the driverless modes, vehicle routing, etc.). In other examples, face recognition may be integrated for passengers or vehicle owners to use by just stepping up to their automobiles, or in other examples by passengers approaching the vehicles in airports or bus stations, etc.

Moreover, some embodiments may provide enhanced features beyond merely dimming capabilities.

Figure 3B:
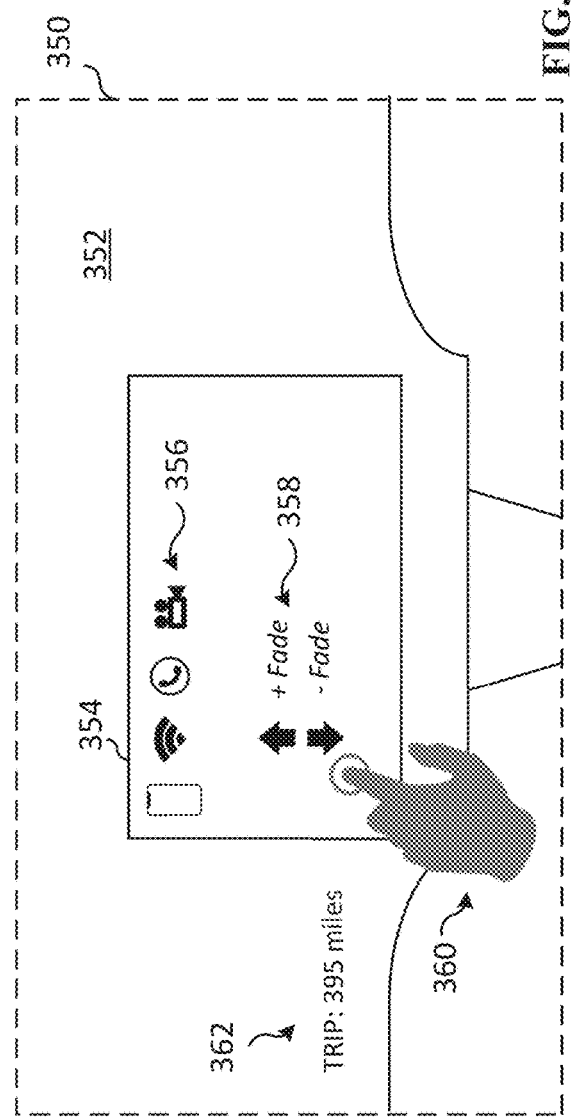

FIGS. 3A-B illustrate example user interfaces for managing the window system 100 of FIG. 1, including an integrated UI 300 and a separate UI 350 (e.g., using the vehicle's dash console 350).

FIG. 3A illustrates an example embodiment including an integrated UI configuration 300 (e.g., UI inputs are separate from the window panel) of the dimmable window system of FIG. 1. The example of FIG. 3 shows the window panel 100F with the display layer enabled to show imagery 302 or video content. For example, in FIG. 3, the display element of the window 100F is showing a scenic mountain view 302 and video content 304. The passenger may choose to show a scenic view 302 rather than what is outside of the vehicle. Other visual elements may be shown on the display surface, such as a movie 304. Interactive elements 306 may be shown for controlling aspects of the window system 100F or the vehicle system such as cabin controls (not shown). The interactive elements 306 show options for the passenger 310 to increase the fade or decrease the fade of the window panel 100F. The passenger 310 may use gestures (e.g., swipe up, swipe down) or press on the interactive elements 306 to control the window panel 100F. Any interactive elements may be possible. For example, gaming controls and gaming video may be presented on the window panel 100F for entertainment of the passengers. One skilled in the art will recognize that any combination of interactive elements, video or imagery elements may be shown.

User input for controlling the window system 100F may be provided through gesture-based user inputs that may be superimposed onto or within the window panel 100F. In some embodiments, the user inputs may be based on user-definable apertures on the window panel 100F (as shown in the example of FIG. 2D). In some instances, the entire surface area of the panel 100F may be used to capture user input. Interfaces for the user input 310 may control cabin features such as interior lights, air conditioning, music, etc. In some embodiments, the system may include microphones for sound input (e.g., voice controls to the window systems 100F or interfacing to a cell phone); in other embodiments, the system may include video cameras for visual communication or visual input (e.g., gestures) to for controlling the window systems 100F.

In other embodiments, the interactive dimmable window systems may allow passengers to use finger gestures (e.g., pinch and zoom, swipe, etc.) that selectively expose at least a portion of an electronically shaded window in the vehicle cabin.

FIG. 3B illustrates an example embodiment including a separate UI configuration 350 (e.g., UI inputs are separate from the window panel) of the dimmable window system 100 of FIG. 1. In the example of FIG. 3B, the UI elements for controlling the window system may be included in the dashboard area 352 or dashboard console 354 of the vehicle. The dashboard area 352 may include other trip data such as mileage 362. The dashboard console 354 or its UI may provide elements for controlling or monitoring the window system. For example, the UI 354 may present elements 358 to control the opacity of the window panel. For example, the UI 354 may present elements 356 to control the media content, video phone content, wireless connection, or phone settings of the window system. For example, the window panel may be used for video conference calls so users on the other end of a video call may be shown on the window panel. The user 360 may use gestures or any suitable method to increase or decrease the fade of the window panel. In some embodiments, the window panel may be part of the entertainment system of the vehicle. For example, multimedia may seamlessly transition between the window panel and other display devices of the vehicle. In other embodiments, the window panel displays may be linked in any combination with each other and/or other display devices of the vehicle.

Figure 4:
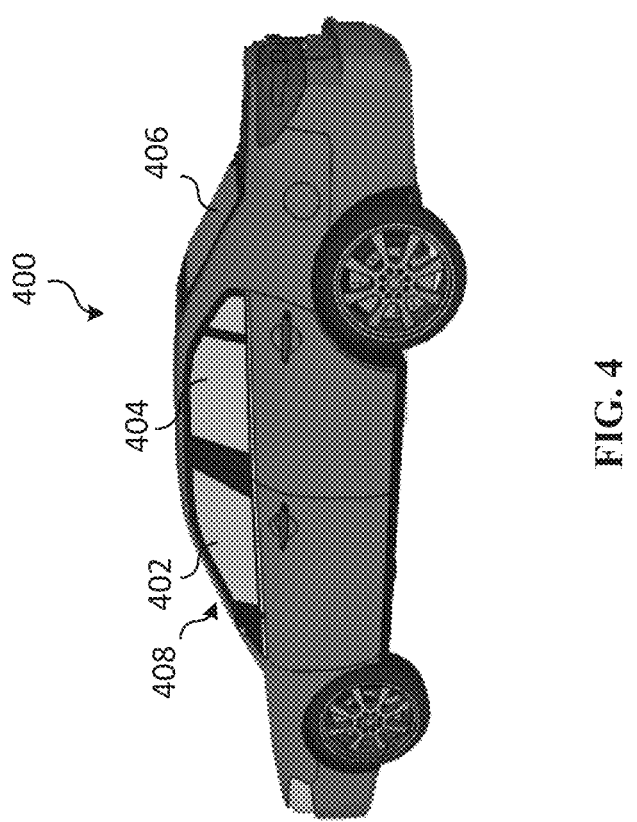
FIG. 4 is a diagram illustrating an example vehicle including window systems installed on the vehicle, according to an embodiment of the disclosure.

FIG. 4 is diagram illustrating an example vehicle 400 including window systems installed on the vehicle 400, according to an embodiment of the disclosure. In one embodiment, the vehicle 400 may be a passenger car. The window systems may be used in each window/windshield 402, 404, 406, 408. It will be appreciated that the dimmable window system may be used on any combination of the windows. For example, in some embodiments, the window system may be used for only the side windows because users may have less need for an interactive front windshield and interactive rear window. In other embodiments, all windows/windshields may use the interactive window systems. For example, when the vehicle is an autonomous vehicle, it may be desirable to provide interactive elements for both the front windshield and rear window.

The interactive dimmable window systems may include dimmable window panels, a passenger interface, and a window control unit. The dimmable window panel may be an electrical window panel that may be configured to be electrically varied between a clear setting, in which a passenger may look through the dimmable window panel, and a dimmed or shaded setting in which in which light from outside of the vehicle may be blocked or substantially blocked from passing into the interior cabin.

The window may be physically capable of being opened or closed ("rolled down" or "rolled up"). Control of the physical positioning may be made in concert with the gestures or the state of the window system.

The passenger interface may be coupled to the dimmable window panel. For example, the passenger interface may be overlaid onto the dimmable window panel. In one embodiment, the passenger interface may be embedded within the dimmable window panel. In another embodiment, the passenger interface may be integrally formed with the dimmable window panel. For example, the dimmable window panel may include the passenger interface.

The passenger interface may be configured to interactively engage the dimmable window panel. For example, the passenger interface may be configured to adjust dimming or shading) of the dimmable window panel, show video, graphics, text, etc. on the dimmable window panel.

The passenger interface may include a display and a touch screen. In one embodiment, the display may be a transparent screen that is overlaid on and/or embedded into the dimmable window panel. The display may be or include a plurality of light-emitting diodes (LEDs). In another embodiment, the display may include a plurality of organic LEDs (OLEDs). In another embodiment, the display be a liquid crystal display (LCD).

The touchscreen may be layered onto the display, or may be embedded within the display. In another embodiment, the display and the touchscreen may be configured to allow passengers to interact with the interactive dimmable window system through engagement via finger gestures, for example.

The window control unit may be operatively coupled to the dimmable window panel and the passenger interface, such as through one or more wired or wireless connections. The window control unit is configured to control dimming of the dimmable window panel and interactively therewith via the passenger interface.

As described herein, the interactive dimmable window system may include the dimmable window panel, and the passenger interface coupled to the dimmable window panel. For example, the passenger interface may be overlaid onto, embedded within, or formed with the dimmable window panel. The passenger interface includes the touchscreen that may be configured to allow for touch-control of an electronic shade of the dimmable window panel.

In operation, a passenger may be able to control the dimmable window panel through the passenger interface. For example, the window control unit may include or may be coupled to a memory that stores instructions that correlate various gestures with operation of the dimmable window panel. For example, in order to increase dimming of the window panel, a passenger may engage the dimmable window panel through the touchscreen with a first gesture. The first gesture may be a tap, etc. For example, a single tap of a finger on the dimmable window panel may increase dimming of the window panel a predetermined amount. In another embodiment, the single tap of the finger may fully shade the dimmable window panel. An additional single tap of the finger may un-shade the dimmable window panel. The single tap may be merely an example of the gesture. Various other gestures may be used to shade and un-shade the dimmable window panel.

In another example, the dimmable shade may be controlled automatically based on the ambient outside environment.

Certain areas of the dimmable window panel may be designed for shading and un-shading based on a gesture, such as a finger tap, swipe, or the like. For example, an upper half of the dimmable window panel may be configured to increase shading based on a finger tap, swipe, or the like, while a lower half of the dimmable window panel may be configured to decrease shading based on a finger tap, swipe, or the like.

When the dimmable window panel is dimmed (e.g., shaded), a passenger may use another gesture to un-shade a portion of the dimmable window panel. For example, the passenger may use two fingers to pinch and expand a clear aperture (such as a clear hole) through the shaded dimmable window panel, in order to peer through without flooding the internal cabin with light from outside the vehicle. In another embodiment, the individual may gently poke an area of the shaded window panel to provide a clear aperture through the shaded dimmable window panel. The clear aperture may be determined by the window control processing unit to be predetermined radius from the center of the finger poke, such as a 10-inch radius (optionally the radius may be greater or less than 10 inches). The clear aperture formed through the shaded dimmable window panel may remain open until the passenger touches the clear aperture again, which may then re-shade the area. In another embodiment, the window control processing unit may automatically close the clear aperture after a predetermined period of time, such as 1 minute (optionally, the window control unit may close the clear opening after a greater or lesser period of time than 1 minute).

In another embodiment, the window control processing unit may show a menu on the display, based on a gesture from the passenger. For example, the passenger may tap a particular portion of the dimmable window panel, which may cause the window control processing unit to show an interactive menu on the display, which may show on the dimmable window panel. The menu may include options for shading, travel data, surrounds, vehicle controls, or the like. The menu may be shown over an entirety of the dimmable window panel, or a portion thereof. The menu may include graphics or text.

In another embodiment, the window control unit may show various information about the trip (e.g., routes, trip data, etc.) and the area (close-by restaurants, stores, etc.) on the dimmable window panel. The window control processing unit may show such information in response to a command from the passenger (such as through one or more interactive gestures with the passenger interface), or automatically without a command from the passenger. In another embodiment, the window control processing unit may show graphics or text on the dimmable window panel, via the display controls.

In another embodiment, the window control processing unit may be configured to control the cabin of the vehicle such as lighting, music, air conditioning, etc.; in other embodiments, the window control processing unit may be configured to control exterior elements of the vehicle, for example, external lights—or displays on the outside of the vehicle.

In yet another embodiment, the solar collector/cells may power at least a portion of the window, for example at least a portion of the energy for the touch-sensitive layer, OLED display, and dimmable layer may be provide in part or in whole from the solar cells. In some cases where the solar cells provide sufficient power, the solar cells may entirely power the window. If sufficient power remains, the solar cells may capture energy for storage in a battery. When the window panels include solar cells, each window may be powered individually by its own solar cell. In other embodiments, the solar cell energy may be pooled for powering the windows. When the windows are not in operation (e.g., when they are off or when the vehicle is off), the solar cells may store power in the battery for use at a later time. Power may be supplemented in whole or in part from another power source such as a battery or the vehicle engine/motor. When solar cells are not used, the window panels may be powered entirely by the other sources.

Because the solar cell layer may be on an outside surface, the solar cells may capture energy from both outside and inside the cabin (e.g., OLED display or cabin lights). For example, some of the leakage light or reflected light from the OLED display may be captured by the solar cells.

The windows control processing unit may modulate power to the window unit based on the available solar power—for example, when low power is available (e.g., during cloudy weather or low sunlight times) the control unit may control the window to show media at a lower brightness. In anther embodiment, the windows control processing unit may modulate power to the window unit based on the ambient conditions. For example, the brightness of the display may be adjusted based on the ambient light such that brightness is normalized on the display.

In some embodiments, the vehicle may include autonomous (complete or full-time control by the vehicle computer system) systems and modes and/or semi-autonomous (some control by the human driver) systems and modes. In this disclosure, "autonomous" or "driverless" may refer to both fully autonomous or semi-autonomous modes.

The systems and method disclosed herein may be applicable to either or both autonomous and semi-autonomous modes. The vehicle system may include a drive processing unit that may enable the autonomous and semi-autonomous modes; the vehicle system may include any number of sensors and controls to enable the drive processing unit to navigate the vehicle, including sensors such as camera, infra-red cameras, lasers, lidars, radar, microphones, and the like. The sensors may enable the vehicle to sense see or perceive the road environment, e.g., creating a 3D map of the terrain, comparing the route to stored maps or live maps received wirelessly.

In some embodiments, the autonomous system may be coupled the window system. The autonomous system may provide inputs for the window system (e.g., the mapping of the road terrain, route, telemetry, trip data, etc.) and window system may provide inputs (e.g., via user inputs entered on the window system) to the autonomous system (e.g., to direct the vehicle to a destination, to control speed, power, etc.). Passengers and the driver may receive information from the autonomous system and may provide input to the autonomous system via the window system.

The vehicle 400 may include other components for enabling autonomous mode (or driverless mode). In some embodiments, the vehicle 400 may include a user interface device (e.g., 300 or 350 of FIGS. 3A-B), autonomous driving sensors, autonomous mode controllers, an entertainment system, and an entertainment system controller. The vehicle 400 may include any private or commercial vehicles such as a car, truck, sport utility vehicle, motorcycle, taxi, bus, train, airplane, boat, etc.

Figure 5:
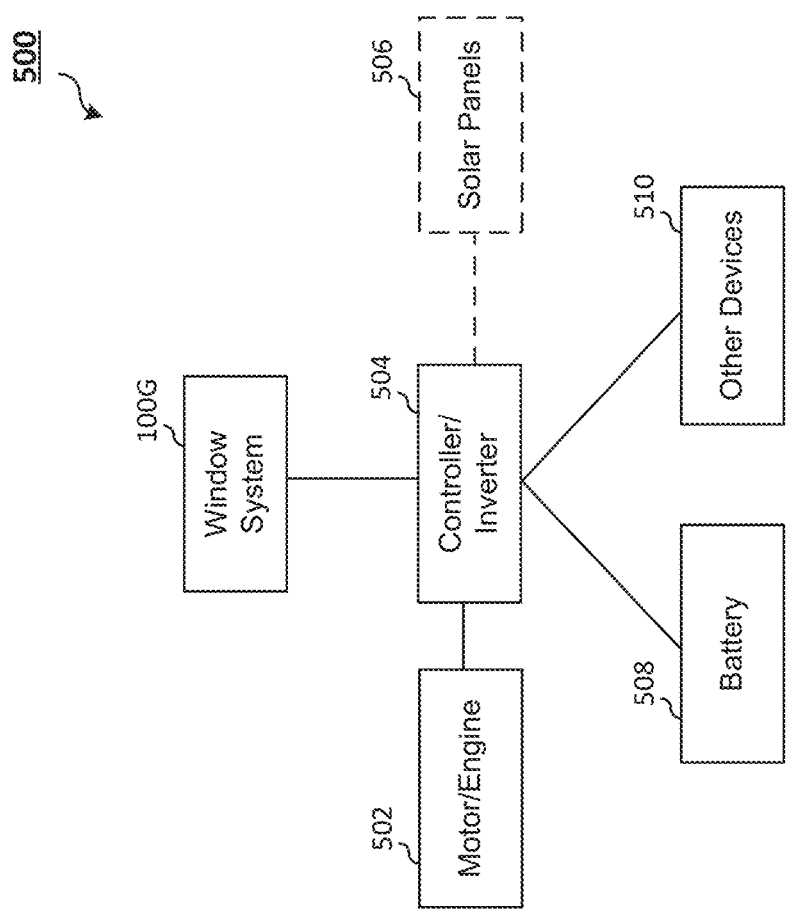
FIG. 5 is a diagram illustrating the flow of power between some components of a vehicle system 50, including power to and from the window system 100G.

FIG. 5 is a diagram illustrating the flow of power between some components of a vehicle system 500, including power to and from the window system 100G. In FIG. 5, for simplicity, window system 100G may be used interchangeability with the solar cells or the electric devices (e.g., the OLED display) of the window system 100G. Only some power components of the vehicle system 500 are shown to avoid obscuring details of the disclosure. Some of the window panels in the window system 100G may include solar cells (e.g., integrated as a layer of the window panel) for generating power. In some embodiments, the window panels may omit integrated solar cells. One or more solar panels 506 may be optional elements in addition to or in the alternative to the integrated solar cells included on the window panels. For example, a vehicle may have a solar panel 506 on the roof top that does not include any window elements. In other embodiments, solar panels 506 may be included in other areas of the vehicle such as the hood, trunk, etc. When the optional solar panels 506 are included, power may be generated by any combination of the solar cells on the window system 100G and the solar panels 506.

In some embodiments, controller/inverter 504 may be coupled to the controller 110 for the window system 100A as illustrate in FIG. 1. In other embodiments, the window system controller 110 may be included in controller/inverter 504. The controller/inverter 504 may regulate and manage the power to and from the solar cells 506 and the solar cells within 100G. While controller/inverter 504 is shown as a single component, the controller/inverter 504 may be implemented in any suitable manner including any number of charge controllers, inverters, AC/DC converters, transformers, processors, etc.

The controller/inverter 504 may collect the power generated from solar cells of the window system 100G and deliver the power back to enable functionality of the window system 100G. A centralized controller/inverter 504 may enable pooling of solar cell power generation. In some embodiments, the window system 100G may include its own integrated controller/inverter, such as integrated to the window panel, (not shown) to simplify usage of the solar cells.

The controller/inverter 504 may monitor (e.g., using a processor) power usage at the window system 100G and power generation at the solar cells 506, 100G. For example, the controller/inverter 504 may determine the source of power for delivery to the window system 100G, other devices, and/or motor/engine. The controller/inverter 504 may determine the destination for the power generated from the solar cells 506, 100G.

In some embodiments, the controller/inverter 504 may monitor the power generation of the windows system 100G to use as a threshold determination for whether to source power from the other elements. In an example, when the window system 100G generates less than the amount of power required by the window system 100G, the controller/inverter 504 may draw power from the solar panels 506, battery 508, and/or motor/engine 502. In another example, when the window system 100G generates more power than required by the window system 100G, the controller/inverter 504 may divert some of the power to the battery 508, other devices 510, and/or motor/engine 502. In another example, when the window system 100G generates the same or substantially similar amount of power required by the window system 100G, the controller/inverter 504 may route power between (to/from) the solar panel 506, motor/engine 502, and/or other devices 510.

While the figures and descriptions provide the configuration as shown in FIG. 5 including the configuration of the controller/inverter 504 performing the processes, one skilled in the art will appreciate that other designs for the configuration and for the power control are possible. For example, the processing may be centralized or distributed in other processing modules (e.g., engine control unit, dashboard controller/processor, entertainment processing unit, drive control unit, etc.)

Figure 6:
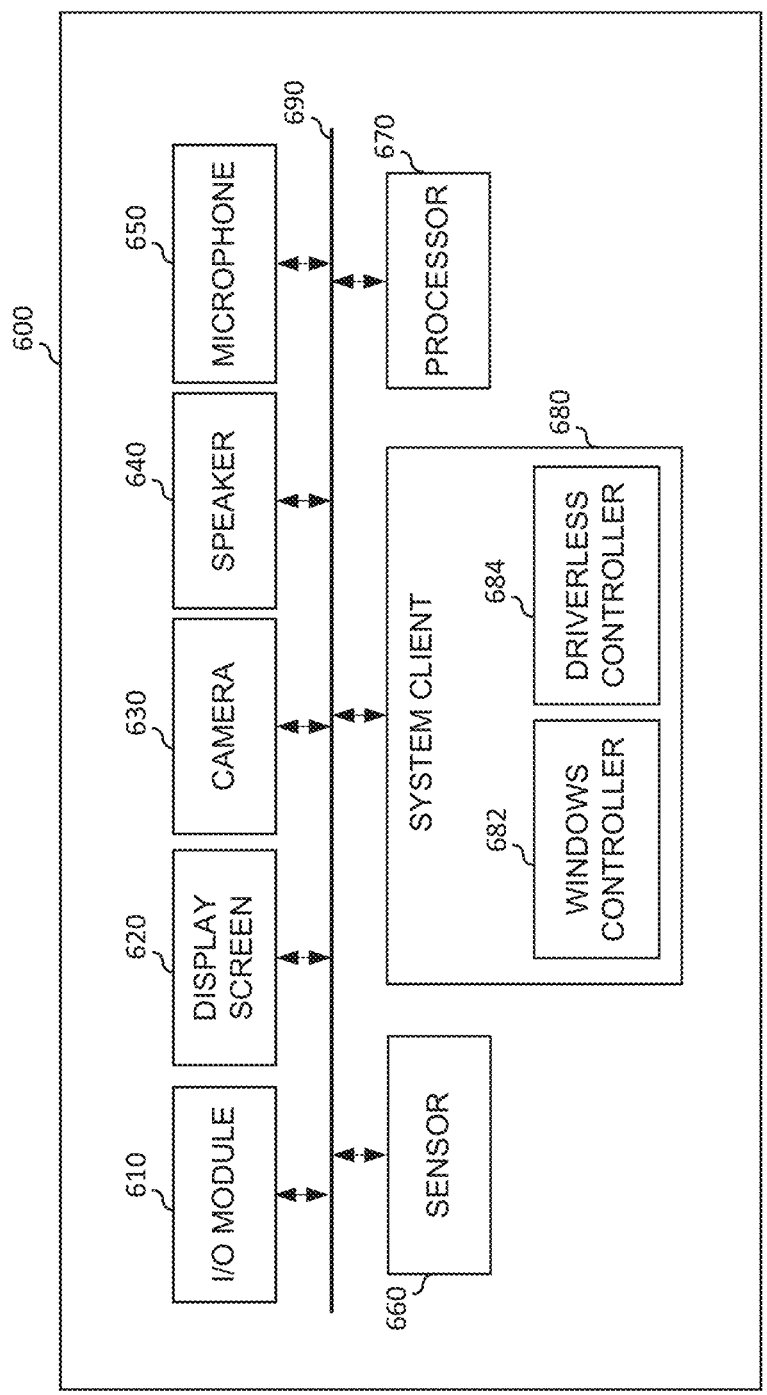
FIG. 6 is an exemplary block diagram 600 of the control module or processing unit device for controlling either or both of the window system 100 of FIG. 1 and an autonomous system.

FIG. 6 is an exemplary block diagram 600 of the control module or processing unit device for controlling either or both of the window system 100 of FIG. 1 and the autonomous system. For example, block 600 may be controller 110 of FIG. 1. In another example, block 600 may be a different controller coupled to window system 100.

The system may include processor 670, I/O module 610 (including wired or wireless modules), display screen 620 (which may be one of the displays 102C of system 100 or a separate display from system 100), camera 630, one or more speakers 640, microphone 650, sensor device 660 (which may include interior and/or exterior for monitoring inside, outside, or other aspects of the vehicle), data bus 690 used for communication between the components, and system client 680 including window controller 682 or driverless controller 680, which may be implemented as either a software application and/or hardware component and may be executable by processor 670 to facilitate operation of the window system and driverless unit. Processor 670 may also operate I/O module 610, display screen 620, camera 630, speaker 640, microphone 650, and vehicle sensors 660 in support of controlling the windows system and enabling driverless modes. For example, I/O module 610 may send and receive road data between the modules; receive data (whether storage, received wireless, or through real time capture) may be displayed on display screen 620; camera 630 may provide video data for use with the modules; speaker(s) 640 may play the received audio data; microphone 650 may provide audio input, e.g., for voice control or for video conferencing, etc.; and sensor(s) 660 may read environmental data during the trip.

Figure 7:
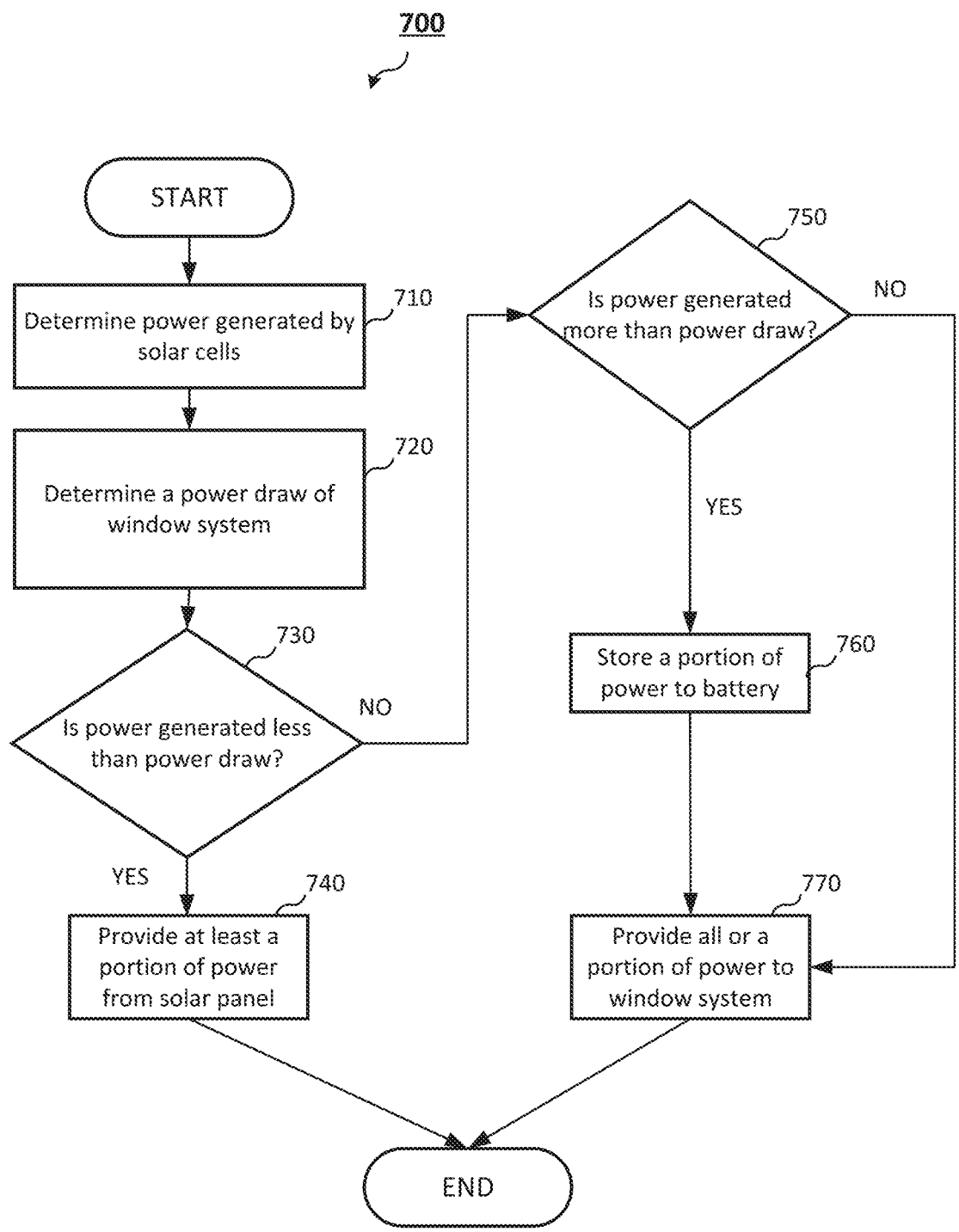
FIG. 7 is an exemplary flow diagram illustrating methods for controlling the window system. The window system may be the window system 100 of FIG. 1.

FIG. 7 is an exemplary flow diagram illustrating methods for controlling the window system. The window system may be the window system 100 of FIG. 1. The method may be performed by controller 110 of FIG. 1. In addition, or in the alternative, the method may be performed by module 600 of FIG. 6. The method may include, at step 710, determining an amount of power generated by solar cells. For example, the power generated may be an amount of power generated by any combination of the power cells, including the cells on the window panels or standalone power cells, on a vehicle. The solar cells may be coupled to each window of the vehicle; the solar cells may be a roof top solar cell. The method may include, at step 720, determining a power draw of the window system. The power draw may be the power usage of any combination of the window panels of the vehicle. In some embodiments, each solar cell of a window panel may power the window electronics coupled to that solar cell. In other embodiments, the solar cell power may be pooled to power any or all of the window panels and other devices (or store at least a portion of the power to battery). The method may include, at step 730, determining whether the power generated is less than the power consumption. For example, the power generation of each solar cell (or aggregate power generation of the solar cells) may be insufficient to power the window panels. In such instances, the method may need to either put the window panel(s) into a low-energy state or deliver power from another source. In response to determining that the power generated is less than the power draw, the method, at step 740, may provide at least a portion of the power to the window panel from the solar cells. As previously mentioned, at step 740, the method may in addition, or in the alternative, put the window panels into a low energy state. In response to determining that the power generated is not less than the power draw, the method may proceed to step 750, where the method may include determining whether the power generated is more than the power consumption. If the power consumption of one or more of the window panels is less than the power generated, then there may be extra unused power. In such instances, the method may, at step 760, divert some of the generated power to another system (e.g., the drive unit, other cabin interior devices, etc.) or for storage in a battery. In another example, the method may boost the power usage at the window panels to a higher power consumption state—for example, by increasing the brightness of the window panel, etc. In determining that the power generated is more than the power draw, the method may proceed to step 770. At step 770, the method may include storing at least a portion of the power to battery and then proceeding to step 770 for providing power to the window system. At step 770, the method may provide all of the power for at least one of the window panels. It will be appreciated by one skilled in the art that the process may be arranged in any operative order. For example, the determination of steps 750 and 730 may be flipped. It will be appreciated by one skilled in the art that any arrangement of power delivery to the window panels may be possible based on the available power generated and power consumed by the window panels. Returning to step 750, in response to determining that the power generated is not more than the power draw (i.e., that the power generated equals or substantially equals the power draw), the method may include, at step 770, providing all the power for operating the window panel, that all power consumption by the window panel is provided by the solar cells. The method may be performed per window panel or it may be performed for any combination of the window panels. It will be appreciated that regardless of the power draw or power availability, some or all of the power may be diverted to other components of the vehicle or for storage in the battery.

Figure 8:
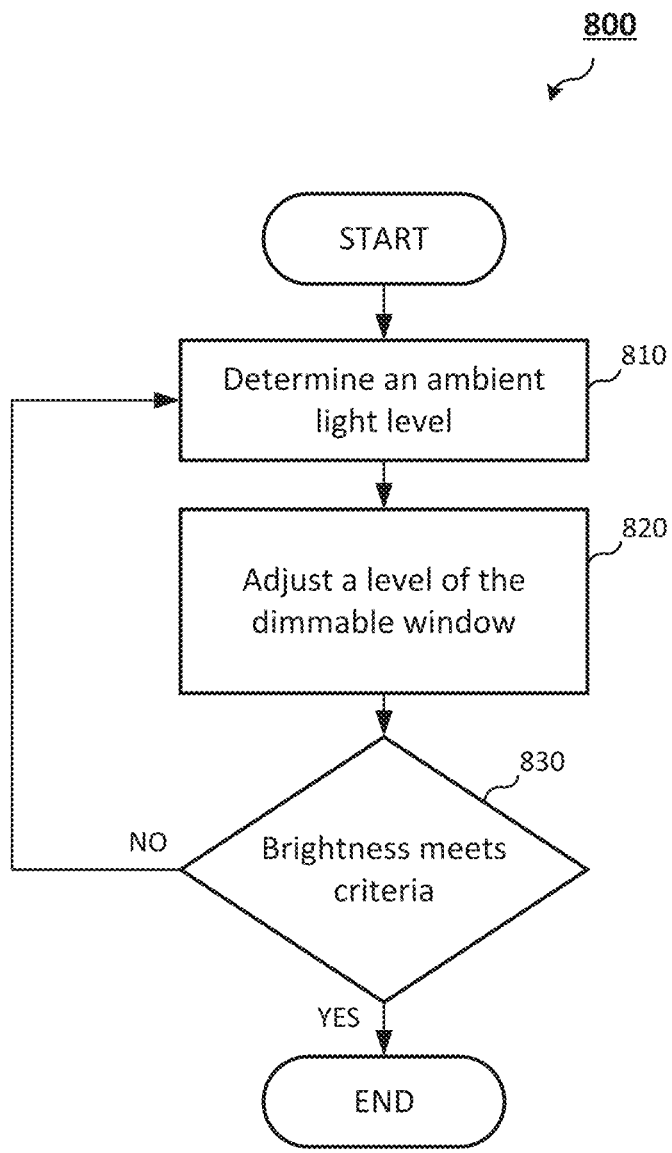
FIG. 8 is another exemplary flow diagram illustrating methods for controlling the window system.

FIG. 8 is another exemplary flow diagram illustrating methods for controlling the window system. The window system may be the window system of FIG. 1. The method may be performed by controller 110 of FIG. 1. In addition, or in the alternative, the method may be performed by module 600 of FIG. 6.

The method may include, at step 810, determining an ambient light level. For example, the method may include polling a light sensor to determine the ambient light level. In some embodiments, the solar cell may be used as an indication of light levels based on the power generation of the solar cell (e.g., higher power generation means higher light levels). The method may include, at step 820, adjusting a level of the dimmable window. For example, the level may represent a level of light transmission or reflection. Adjusting the level may be based on incrementing up or down in settings or adjusting to a set level based on the ambient light reading. In some embodiments, the adjustment may be based on determining one or more threshold levels of readings. Based on the threshold, the method may decrement, maintain the setting, or increment the level (e.g., of light transmission). In some embodiments, the threshold levels may be pre-determined based on user preference. In other embodiments, the threshold levels may be based on calibrated values. In some embodiments, the method may end after step 820.

The method may include, at step 830, determining whether the interior brightness meets some criteria. The interior brightness may be measured anywhere inside the cabin including near the passenger adjacent to the window panel. The criteria may include any number of factors. In some embodiments the factors may include user-defined levels, thresholds based on time-of-day, etc. At step 830, in response to determining that the brightness meets the criteria, the method may end. At step 830, in response to determining that the brightness does not meet one or more criteria, the method may return to step 810. Accordingly, the method may end or repeat in a loop. In some embodiments, the adjustments may be overridden by a user or passenger.

Some portions of the detailed descriptions above may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "storing," "detecting," "retrieving," "granting," "performing," "locking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specifically constructed for the required purposes, or it may be general purpose computer system selectively programmed by a computer program stored in the computer system. Such a computer program may be stored in a computer readable storage medium, such as, but not limited to, any type of disk including optical disks, CD-ROMs, DVD-ROMs, Blu-ray disks, magnetic-optical disks, read-only memories (ROMs), random access memories (RAMs), EPROMs, EEPROMs, magnetic-optical disk storage media, optical storage media, flash memory devices, solid state devices, other type of machine-accessible storage media, or any type of media suitable for storing electronic instructions, each coupled to a computer system bus.

The algorithms and displays presented herein are not inherently related to any particular computer or other apparatus. In some embodiments various general-purpose systems may be used with programs in accordance with the teachings herein, or it may prove convenient to construct a more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A window system for use in a vehicle, comprising:
a first layer electrically controlled to fade between states comprising an opaque state and a transparent state;
a second layer coupled to the first layer, the second layer electrically controlled to display visual imagery on the window, wherein the second electrically controlled layer is coupled to an inside surface of the first layer; and
a window control processing unit configured to control the state of the first layer to at least partially block ambient light from an exterior of the vehicle based on brightness of the visual imagery of the second layer,
wherein the first layer and second layer are configured to derive at least a portion of energy for their operation from a solar light source.

2. The window system of claim 1, where the second layer comprises an organic light emitting diode array arranged on a substrate.

3. The window system of claim 2, wherein the first layer and second layer are distinct physical layers, with the first layer on either the outside of the window or on the inside of the window.

4. The window system of claim 1, wherein the portion of energy is transferred from a solar panel coupled to an outside surface of the vehicle.

5. The window system of claim 1, wherein the first layer and the second layer are controlled based on input from a user input interface system.

6. The window system of claim 5, wherein the user input interface system comprises a touchscreen module on a dashboard of the vehicle.

7. The window system of claim 5, wherein the user input interface system comprises a touch sensitive physical layer on an inside surface of the window system.

8. The window system of claim 1, further comprising a photosensor for monitoring ambient light, wherein the window control processing unit adjusts the states of the first layer based on a reading of the photosensor.

9. The window system of claim 1, wherein the window control processing unit is further configured to enable the visual imagery of the second layer based on determining an alertness of at least one occupant of the vehicle, the alertness level determined at a camera on the interior of the vehicle.

10. The window system of claim 3, wherein the first layer is one of an electrochromic glass, photochromic glass, thermochromic glass, suspended-particle glass, micro-blind glass, polymer-dispersed glass, or liquid-crystal glass layer.

11. A method for controlling a tint-able window system of a vehicle, the method comprising:
controlling a light transmission state of a first layer of the window system;
controlling visual imagery output of a second layer of the window system, wherein the second layer is coupled to an inside surface of the first layer;
controlling, at a window control processing unit, the light transmission state of the first layer to at least partially block ambient light from an exterior of the vehicle based on brightness of the visual imagery output of the second layer; and
receiving at least a portion of power from a solar energy source for controlling the first layer and the second layer.

12. The method of claim 11, further comprising:
receiving input at a user input interface system;
controlling one of the light transmission state or visual imagery output based on the received input.

13. The method of claim 11, further comprising:
determining an ambient light level at a photosensor;
controlling the light transmission state of the first layer based on the determined ambient light level.

14. The method of claim 11, further comprising:
detecting at least one of an occupant count or an alertness level of an occupant of the vehicle; and
enabling visual imagery output based on the occupant count or the alertness level of the occupant.

15. The method of claim 11, further comprising using face recognition for inputs to the window system.

16. A vehicle system having an electrically controlled tint-able window, the vehicle system comprising:
the electrically controlled tint-able window, the window comprising a first layer electrically controlled to tint between opaque states and a second layer electrically controlled to display visual imagery, wherein the second layer is coupled to an inside surface of the first layer,
a window control processing unit configured to control the state of the first layer to at least partially block ambient light from an exterior of the vehicle system based on brightness of the visual imagery of the second layer; and
a solar energy collector coupled to the window for providing at least a portion of energy for operation of the window.

17. The vehicle system of claim 16, further comprising a user input interface system coupled to the window for receiving user input to control operation of the window.

18. The vehicle system of claim 16, further comprising a window control processing unit coupled to the window for controlling operation of the window.

19. The vehicle system of claim 18, further comprising a photosensor for monitoring ambient light, the window control processing unit configured for controlling the operation of the window based on the ambient light.

20. The vehicle system of claim 16, further comprising a camera on an interior of the vehicle coupled to the window control processing unit, wherein the camera is configured to monitor at least one occupant of the vehicle, and the window control unit is further configured to enable the visual imagery of the second layer based on determining an alertness of the at least one occupant of the vehicle.

21. The vehicle system of claim 16, wherein the tint-able window further comprises a third layer comprising solar cells configured as the solar energy collector, the solar cells configured for converting solar light to the portion of energy for the operation of the window.

22. The vehicle system of claim 21, further comprising a battery for storage of energy from the solar cells.

23. The windows system of claim 5, wherein the user input interface system uses facial recognition for input.

24. The vehicle system of claim 16 further comprising a user input interface system using facial recognition to control the vehicle system.

* * * * *